3,816,592
PROCESS FOR THE PURIFICATION OF RAW SODIUM CHLORIDE BRINES

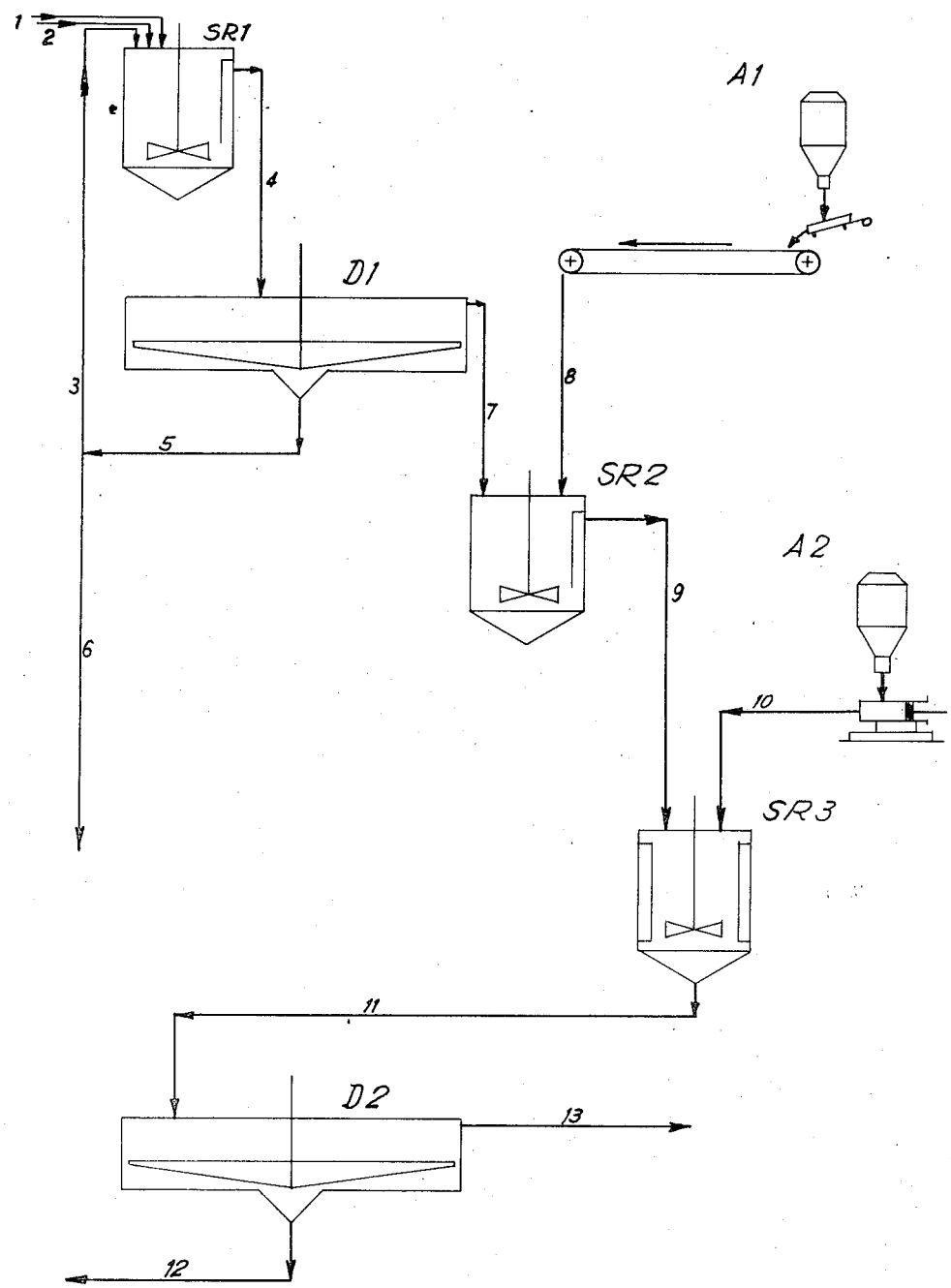

Francesco Rinaldi, Follonica, Ferruccio Alberti, Milan, and Paolo Aguzzi, Novara, Italy, assignors to Montecatini Edison S.p.A., Milan, Italy
Filed Nov. 18, 1971, Ser. No. 200,021
Claims priority, application Italy, Nov. 21, 1970, 32,023/70
Int. Cl. C01d 3/06, 3/16
U.S. Cl. 423—190                6 Claims

ABSTRACT OF THE DISCLOSURE

A process is disclosed for purifying raw sodium chloride brines containing impurities such as: Ca, Sr, Ba, Mg, Fe, Al and Ni, said process comprising the following successive stages, conducted in a continuous way and at room temperature:

(a) the raw brine is mixed under stirring together with a solution containing $SO_4^{--}$ ions and with a fraction of slurries thickened in the succeeding decanting stage (b), so as to obtain the precipitation, as sulphates, of up to 60% of the $Ca^{++}$ ion and substantially all the $Sr^{++}$ and $Ba^{++}$ ions present in the mixture;

(b) the slurry thus obtained is left to decant, thereby separating a thickened substance which is partly recycled into the preceding stage (a), and the clarified substance which is sent to the subsequent purification stages;

(c) the brine clarified in the preceding stage (b) is treated with alkaline carbonate or with carbon dioxide, under stirring, so as to complete the precipitation, in the form of carbonates, of the $Ca^{++}$ ion that has remained in the solution and of the $Sr^{++}$ and $Ba^{++}$ ions possibly left in the solution;

(d) the slurry coming from the previous stage (c) is treated with caustic soda and, if desired, with a coagulant, under slight stirring, so as to precipitate as hydroxides, prevailingly in the form of flakes, substantially all the $Mg^{++}$, $Fe^{+++}$, $Al^{+++}$ and $Ni^{+++}$ ions present in the solution; and (e) the slurry containing in suspension the carbonates precipitated in stage (c) and the hydroxides precipitated in stage (d) is left to decant so as to obtain, after settling of the solid phase, the purified brine product.

---

The present invention relates to the purification of raw sodium chloride brines. More particularly, it relates to a process for the purification of raw sodium chloride brines from impurities such as Ca, Sr, Ba, Mg, Fe, Al and Ni.

So far numerous processes have been suggested for purifying raw sodium chloride brines. Many of these processes are operational and economically convenient only when operating in a discontinuous way, while other processes are efficient and operational under continuous operation but under heat.

Thus, a principal object of this invention is that of providing a process that will allow the purification of raw sodium chloride brines in a simple and economical way, while operating in a continuous way and at room temperature.

It is well known that the $Ca^{++}$ ion (together with $Sr^{++}$ and $Ba^{++}$) may be precipitated from the sodium chloride brine in the form of the carbonate, by treating the brine with carbon dioxide or with an alkaline carbonate such as for instance sodium carbonate. This method, however, requires a considerable consumption of reactants and, moreover, in the slurry thus obtained the calcium carbonate is present in the form of small crystals whose sedimentation is particularly difficult even with the use of flocculants.

It has now been found that the sedimentation of the calcium carbonate is enormously facilitated if the above-mentioned slurry is subsequently subjected to another purification stage in which caustic soda is admixed therewith under conditions of light stirring.

In this way the $Mg^{++}$ ion (together with the $Fe^{+++}$, $Al^{+++}$ and $Ni^{+++}$ ions) precipitates as the hydroxide in the form of flakes that incorporate the calcium carbonate crystals precipitated in the previous stage. Thus, the calcium carbonate flocculated from or with the magnesium hydroxide may rapidly settle, with the further advantage that only one single decanting stage is quite sufficient for separating the calcium carbonate as well as the magnesium hydroxide.

By this method the effectiveness of the precipitation of the calcium will depend on the quantity of magnesium hydroxide that has formed and, thus, on the content in $Mg^{++}$ initially present in the brine. In general, the quantity of magnesium hydroxide is not sufficient for incorporating all the calcium carbonate that is suspended in the brine.

It has now been found that this problem may conveniently be solved if the raw brine, before being treated with the alkaline carbonate and with the caustic soda, is preliminarily mixed together with a solution containing $SO_4^{--}$ ions so as to precipitate part of the $Ca^{++}$ ion in the form of sulphates that may be easily separated by decanting.

In particular, it has been found that this preliminary purification stage may be conveniently carried out by using, as a $SO_4^{--}$ ions-containing solution, a fraction of the drainage mother liquor of the final evaporation of the brine, and by then priming the formation of the calcium sulphate by the recycling of a fraction of the slurries separated in the successive decanting. In this way one achieves a further advantage consisting in a considerable saving of reactants throughout the purification cycle.

The above indicated objects, as well as still other objects, may be attained through this invention which has for its object a process for purifying raw sodium chloride brines containing impurities such as Ca, Sr, Ba, Mg, Fe, Al, Ni, the process being characterized in that it comprises the following successive stages carried out in a continuous cycle and at room temperature:

(a) the raw brine is mixed together, under stirring, with a solution containing $SO_4^{--}$ ions and with a fraction of slurries thickened in the successive decanting stage (b), so as to precipitate as sulphates up to 60% of the $Ca^{++}$ ion and substantially all the $Sr^{++}$ and $Ba^{++}$ ions present in the mixture;

(b) the slurry thus obtained is left to decant, thereby separating a thickened substance that is partly recycled into the preceding stage (a), and a clarified substance that is transferred to the successive purification stages;

(c) the brine clarified in the preceding stage (b) is treated with an alkaline carbonate or with carbon dioxide, under stirring, so as to complete the precipitation, in the form of carbonates, of the $Ca^{++}$ ion left in solution and of the $Sr^{++}$ and $Ba^{++}$ ions possibly left in solution;

(d) the slurry coming from the preceding stage (c) is treated with caustic soda and (if desired) with a coagulant, under slight stirring, so as to precipitate as hydroxides, prevailingly in the shape of flakes, all the $Mg^{++}$, $Fe^{+++}$, $Al^{+++}$ and $Ni^{+++}$ ions present in solution; and (e) the slurry containing in suspension the carbonates precipitated in stage (c) and the hydroxides precipitated in stage (d) is left to decant, thereby obtaining, after sedimentation of the solid phase, the desired purified brine.

All the stages of the purification cycle are conducted according to the continuous method and at room temperature, that is, at a temperature at which the brines are to be naturally found depending on the environmental conditions and the weather conditions. Thus, the optimal processing temperature may be any temperature between 0° C. and 50° C.

At stage (a), as a $SO_4^{--}$ ions-containing solution it is preferred to use a fraction of the drainage mother liquor of the final evaporation process of the brine. This mother liquor contains in general from 4–5% by weight of $Na_2SO_4$ and in general is recycled to the extent of 40 to 45 parts by volume per 100 parts of raw brine.

The reaction is continuously primed by recycling a fraction of the slurries thickened by decanting in the subsequent stage (b). Said slurries in general having a solids content of from 270 to 290 grams/liter and are admixed with the raw brine generally at a rate of 3–4 parts by volume per 100 parts of raw brine. This recycling is also useful in that it allows the recovery of part of the sodium chloride contained in the decantation slurries.

In general, the dwell time of the raw brine in stage (a) is between 30 and 45 minutes. The discharge comprises a slurry that contains in suspension a precipitate consisting of calcium, strontium and barium sulphates. The calcium is prevailingly present in the form of the sulphate hemihydrate the precipitation of which is quite easy to achieve and which may be carried out by simple decanting, without requiring the aid of flocculating agents.

If one starts from a raw brine saturated with $CaSO_4$ (that is, containing about 0.49% of $CaSO_4$) in stage (a) there precipitates about 60% of the $Ca^{++}$ contained in the mixture. On the contrary, if one starts for instance from a raw brine containing about 0.15% of $CaSO_4$ in stage (a) there will precipitate about 20% of the $Ca^{++}$ contained in the mixture.

The brine clarified in stage (b) is then mixed, under stirring, with $Na_2CO_3$, either in solid form or in solution. Said admixture is carried out preferably in a stoichiometric quantity with respect to the quantity of $Ca^{++}$, $Sr^{++}$ and $Ba^{++}$ ions that have remained in solution, and with an excess of 0.4–0.9 grams/liter of brine.

In this way one achieves the final precipitation of the $Ca^{++}$ ion that has remained in solution, according to the following reaction: $CaCl_2+Na_2CO_3\rightarrow 2NaCl+CaCO_3$. Of course, the $Sr^{++}$ and $Ba^{++}$ ions that possibly had not been precipitated in the preceding purification stage also precipitate as their carbonates.

In general, the dwell time of the brine in stage (c) is between 30 and 45 minutes.

The above-indicated carbonates precipitate in the form of very fine crystals which are therefore difficult to separate. Conseqeuntly the slurry is treated with caustic soda, either in the solid state or in solution, until the pH of the solution is brought to a value in general between 10.8 to 11.0. In this way all the magnesium precipitates acording to the reaction: $MgCl_2+2NaOH\rightarrow 2NaCl+Mg(OH)_2$, forming magnesium hydroxide flakes which incorporate the carbonate crystals remaining in the suspension from the preceding stage. Also the $Fe^{+++}$, the $Al^{+++}$ and the $Ni^{+++}$ co-precipitate in the form of hydroxides.

In stage (d) the regulation or setting of the degree of stirring is particularly important inasmuch as only under a slight stirring is it possible to maintain the magnesium hydroxide in a flocculent state.

Thus, for instance, in a reactor having a holding capacity of 180 cubic meters and a cross-section area of 28 square meters, a blade stirrer shall rotate at not exceeding 40 r.p.m. Nevertheless, the reaction rate is rather high; in fact the time of dwell or permanence of the brine in this stage is generally between 10 and 15 minutes.

In case the quantity of magnesium in the raw brine should be too low and that, therefore, the magnesium hydroxide is insufficient for flocculating all the carbonates present in the suspension, it is necessary to admix in stage (d) a conventional organic coagulant of any known type, for instance 0.001–0.002 g. of Praestol 2750 or of Praestol 2935 per liter of brine. Preferably, the coagulant is added when the raw brine contains less than 0.001% of $MgCl_2$.

The flocculating actions of the organic coagulant and of the magnesium hydroxide do not disturb each other; on the contrary, they are synergistic and it has even been observed that the commercial organic coagulant only acts in the presence of magnesium.

After the final decantaing and if desired after a safety filtering, the brine contains from 1–5 p.p.m. of $Ca^{++}$ and 1–2 p.p.m. of $Mg^{++}$, while $Fe^{+++}$, $Al^{+++}$, $Ni^{+++}$, $Sr^{++}$ and $B^{++}$ are practically absent.

In case one wishes to produce solid sodium chloride, it is preferable to transfer the brine to evaporator-crystallizer, for instance of the Swenson-type with multiple-effect. The sodium sulphate crystallizes together with the sodium chloride, but may easily be removed by washing the obtained solid product in counter-current with the mother liquor of the last crystallization stage. In this way all of the sodium sulphate passes into solution into the mother liquor thus discharged.

A fraction of the discharged mother liquor, containing 24% to 25% by weight of NaCl and 4–5% by weight of $Na_2SO_4$, is preferably recycled back into the first stage of the purification process according to this invention, with the double advantage of achieving a saving in reactants in the purification cycle and of reducing the loss in sodium chloride in the discharged mother liquor.

The characteristics and advantages of this invention will be still more easily understood from the following detailed working example which relates to a preferred embodiment and will be described hereunder with reference to the diagram represented in the attached flowsheet.

EXAMPLE

Stage (a)

The purified raw brine 1, coming from the Italian mine of Timpa del Salto, showed a pH value equal to 7.0 and the following mean composition by weight:

| | Percent |
|---|---|
| NaCl | 26.15 |
| $SO_4^{--}$ | 0.422 |
| $Ca^{++}$ | 0.141 |
| $Sr^{++}$ | 0.0012 |
| $Ba^{++}$ | 0.0008 |
| $Mg^{++}$ | 0.010 |
| $Fe^{+++}$ | 0.0004 |
| $Al^{+++}$ | 0.0003 |
| $Ni^{+++}$ | 0.0003 |

The average temperature of said brine at the moment of its use is that corresponding to the room temperature in the month of August, that is, between 25° and 30° C.

About 200 cubic meters of said brine were continuously fed, for a total uninterrupted time of about 200 hours, into a tank-reactor SR1 consisting of a cylindrical vessel with a concave bottom and having the following characteristics:

| | | |
|---|---|---|
| Inner diameter | mm | 1200 |
| Total volume | cubic meters | 2.5 |
| Rotary speed of the stirring device | r.p.m. | 450 |

In the tank-reactor SR1 the raw brine was admixed with a fraction 2 of the mother liquor discharged from the final evaporation process and with a fraction 3 of the slurries thickened in the subsequent stage (b).

The mother liquor discharged from the evaporation process had the following composition by weight:

| | Percent |
|---|---|
| NaCl | 24.1 |
| $Na_2SO_4$ | 4.5 |
| $Ca^{++}$ | Absent |
| $Mg^{++}$ | Absent | and was added in a proportion of 43 parts by volume for 100 parts of raw brine.

The slurries had a content in solids of 280 g./lt. and were added at a rate of 31.5 lt./hr., that is, in a proportion of about 3 parts by volume for 100 parts of raw brine.

The residence time of the system in the tank-reactor SR1 was regulated by the height of the overflow pipe and was equal to 45 minutes. At the outlet there was a flow rate of 1500 liters/hour of slurry 4 containing in suspension 8–10 g./lt. of solids which consisted essentially of Ca-, Sr- and Ba-sulphates.

Stage (b)

The slurry 4 obtained in stage (a) was continuously conveyed into a decanter or settling tank D1 sized in such a way that, for the above-indicated flow rate, there will be obtained an overflow rate of 2.4 meters/hr. and a residence time of 22 minutes.

At the outlet of the decanter D1 there was collected a slurry 5, essentially consisting of Ca-, Sr- and Ba-sulphates and having a thickening degree of 280 grams of solids per liter, and a clarified brine 7 with a residue of solids in suspension of less than 0.08 g./lt.

About 20% of the slurry 5 was eliminated through 6, while the remaining 80% was recycled through 3 into the tank-reactor SR1. Thus, the loss in NaCl in this stage was limited to about 0.86% of the quantity contained in the raw brine initially fed in.

Stage (c)

The clarified brine 7 showed the following average composition by weight:

|  | Percent |
| --- | --- |
| NaCl | 25.53 |
| $Na_2SO_4$ | 1.544 |
| $Ca^{++}$ | 0.0540 |
| $Mg^{++}$ | 0.0069 |
| $Fe^{+++}$ | 0.0003 |
| $Al^{+++}$ | 0.0002 | and was continuously fed into the tank-reactor SR2 of the same size and characteristics as those of tank-reactor SR1.

Through the addition of $Na_2CO_3$ 8, coming from silo A1 fitted with a conventional dosing device, in a proportion of 2.66 grams per liter of brine, and under stirring, there was achieved a total precipitation of the $Ca^{++}$-, $Sr^{++}$- and $Ba^{++}$- in the form of carbonates down to a limit content of 1–5 p.p.m. in a time equal to 45 minutes.

Stage (d)

The slurry 9 flowing out of tank-reactor SR2, and containing in suspension the carbonates that had formed, was continuously fed into the tank-reactor SR3 consisting of a cylindrical vessel with a concave bottom with stirrer and of the following size and characteristics:

| | |
| --- | --- |
| Inside diameter mm | 400 |
| Total volume cubic meters | 0.125 |
| Rotational speed of stirrer r.p.m | 30 |

Into said tank-reactor was added NaOH 10, coming from silo A2 fitted with a conventional dosing device, in the proportion of about 0.25 g./lt. of brine until the pH of the brine is brought up to 19.8–11.0.

In this way, under stirring, there was obtained the total precipitation of $Mg^{++}$, $Fe^{+++}$, $Al^{+++}$ and $Ni^{+++}$ in the form of hydroxides, until reaching down to a limit content of 1–2 p.p.m. over a period of 5 minutes.

At the outlet a slurry 11 is obtained containing in suspension about 1.7 g./lt. of solids consisting of the carbonates and hydroxides that respectively precipitated in SR2 and SR3.

Stage (e)

The slurry 11 was continuously fed into decanter D2 sized so as to obtain an overflow rate of 1.8 meters/hr. and a residence time in the decanter of about 40 minutes. In the decanter the slurry 12 is separated from the clarified brine 13.

In the slurry 12 essentially consisting of Ca, Sr and Ba and of the Mg-, Al-, Fe- and Ni-hydroxides, there was ascertained a loss in NaCl of 0.92% with respect to the quantity contained in the raw starting brine.

The clarified and purified brine 13 was shown to have the following composition by weight.

|  | Percent |
| --- | --- |
| NaCl | 25.32 |
| $Na_2SO_4$ | 1.66 |
| $Ca^{++}$ | 0.0004 |
| $Sr^{++}$ | Absent |
| $Ba^{++}$ | Absent |
| $Mg^{++}$ | 0.00012 |
| $Fe^{+++}$ | Absent |
| $Al^{+++}$ | Absent |
| $Ni^{+++}$ | Absent |

This clarified and purified brine, after passing through final sand filters, was ready for feeding for instance, to a conventional brine evaporation plant.

What is claimed is:

1. A process for purifying raw sodium chloride brines containing impurities including Ca, Sr, Ba, Mg, Fe, Al and Ni, said process comprising the following successive stages, conducted in a continuous way and at room temperature:

(a) the raw brine is treated under stirring, for a time period of 30–45 minutes, with a solution containing $SO_4^{--}$ ions and with a fraction of the substance thickened in the succeeding decanting stage (b), so as to obtain the precipitation, as sulphates, of up to 60% of the $Ca^{++}$ ion and substantially all the $Sr^{++}$ and $Ba^{++}$ ions present in the mixture;

(b) the solution containing in suspension the precipitates of calcium, barium and strontium sulphates is left to decant, thereby separating a thickened substance which is partly recycled into the preceding stage (a), and a clarified substance which is sent to the subsequent purification stages;

(c) the brine clarified in the preceding stage (b) is treated for a time period of 30–45 minutes with sodium carbonate or with carbon dioxide, under stirring, so as to complete the precipitation, in the form of carbonates, of the $Ca^{++}$ ion that has remained in the solution and of the $Sr^{++}$ and $Ba^{++}$ ions possibly left in the solution;

(d) the suspension coming from the previous stage (c) is treated for a time period of 10–15 minutes with caustic soda and, if desired, with a coagulant, under slight stirring, so as to precipitate as hydroxides, prevailingly in the form of flakes, substantially all the $Mg^{++}$, $Fe^{+++}$, $Al^{+++}$ and $Ni^{+++}$ ions present in the solution; and (e) the solution containing in suspension the carbonates precipitated in stage (c) and the hydroxides precipitated in stage (d) is left to decant so as to obtain, after settling of the solid phase, the purified brine product.

2. A process according to claim 1, wherein in stage (a) the solution containing $SO_4^{--}$ ions consists of a fraction of the exhausted mother liquor from the final evaporation of the brine containing 4–5% by weight of $Na_2SO_4$.

3. A process according to claim 1 wherein the exhausted mother liquor from the evaporation is recycled back in a proportion of 40–45 parts by volume per 100 parts of raw brine.

4. A process according to claim 1, wherein the substance thickened in stage (b) is recycled back into stage (a) in a proportion of 3–4 parts by volume per 100 parts of raw brine.

5. A process according to claim 1, wherein in stage (c) the brine is treated with sodium carbonate in stoichiometric ratio with respect to the quantity of $Ca^{++}$, $Sr^{++}$ and $Ba^{++}$ ions left in the solution and with an excess of 0.4–0.9 grams per liter of brine.

6. A process according to claim 1, wherein in stage (d) the caustic soda is added in such a proportion as to bring the pH of the solution to a value between 10.8 and 11.0.

References Cited

UNITED STATES PATENTS

| | | | |
|---|---|---|---|
| 755,415 | 3/1904 | Trantom | 423—192 |
| 1,500,126 | 7/1924 | Hanson et al. | 423—190 X |
| 2,516,988 | 8/1950 | Hengerer | 423—192 |
| 2,624,654 | 1/1954 | Hirsch | 423—499 X |
| 2,764,472 | 9/1956 | Cady et al. | 423—499 X |

FOREIGN PATENTS

| | | | |
|---|---|---|---|
| 169,192 | 9/1921 | Great Britain | 423—192 |

EDWARD STERN, Primary Examiner

U.S. Cl. X.R.

423—499